United States Patent Office 3,445,525
Patented May 20, 1969

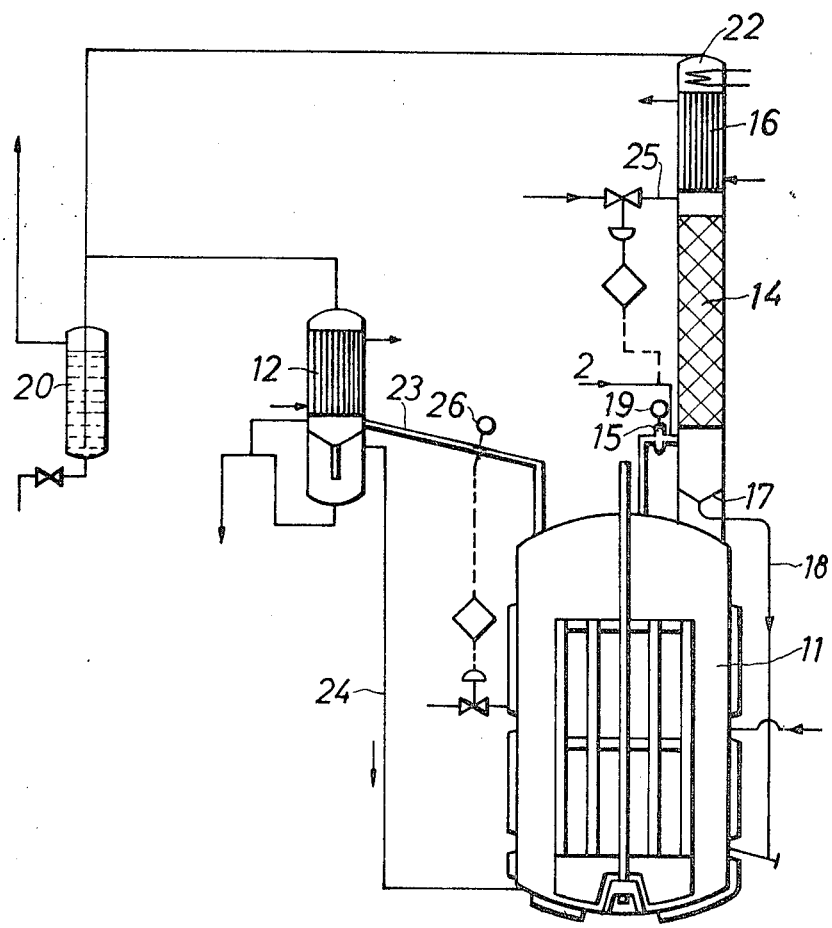
INVENTORS:
HEINRICH BORMANN, HERBERT NORDT.

3,445,525
PREPARATION OF POLYETHERS
Heinrich Bormann and Herbert Nordt, Leverkusen, Germany, assignors to Farbenfabriken Bayer Aktiengesellschaft, Leverkusen, Germany, a German corporation
Filed Apr. 15, 1964, Ser. No. 359,933
Claims priority, application Germany, Apr. 20, 1963, F 39,529
Int. Cl. C07c 41/02, 41/00; C08g 23/00
U.S. Cl. 260—615                    7 Claims

ABSTRACT OF THE DISCLOSURE

A process for preparing a homogeneous liquid and uniformly reactive reaction medium which comprises reacting about 1 mol of an alkali metal hydroxide for each 4 to 12 active hydroxyl groups of an organic compound containing reactive hydrogen atoms in an inert organic liquid solvent capable of forming an azeotropic mixture with water, removing a portion of the azeotropic mixture which forms during the reaction and adding from about 1 to about 3 mols of an alkylene oxide having 2 to 4 carbon atoms to the reaction mixture per hydroxyl group contained therein until the liquid homogeneous medium is obtained; the liquid homogeneous and uniformly reactive reaction medium obtained by the aforedescribed process, and a method for preparing polyethers by adding measured quantities of an alkylene oxide to the reaction medium to form the polyether.

---

This invention relates to the production of polyethers and more particularly refers to a new and improved process for the manufacture of alkylene oxide polyethers especially adaptable for use in preparing urethane foams.

The production of polyethers by polymerizing an alkylene oxide in the presence of an organic compound containing reactive hydrogen atoms is well known. However, many problems occur during the operation which are detrimental to the production of polyethers useful especially for preparing foam urethanes. Polyethers for use in polyurethane foam should have a high standard of purity and be of a specified average molecular weight. Heretofore known methods for preparing polyethers have been unable to provide uniform products having a desired molecular weight. Additionally, side reactions or decomposition reactions have occurred in the polymerization media because of sensitivity to heat and oxidation.

It is an object of the present invention to provide an efficient continuous process for producing alkylene oxide polyethers. Another object of this invention is to provide an improved method for preparing polyethers useful in the preparation of urethane foams which polyethers have uniform molecular weight and high purity. A still further object of this invention is to provide a novel starting medium useful for the controlled polymerization of alkylene oxides which medium is analytically pure, uniform in reaction, homogeneous as a fluid, and easy to use in accurate quantities.

In accordance with the present invention, high quality polyethers useful in preparing urethane resins are produced in a continuous and controlled operation by providing a homogeneously liquid and uniformly reactive starting medium from a method which comprises reacting an organic compound containing a plurality of reactive hydroxyl groups with an alkali metal hydroxide in a ratio of 1 mol of metal hydroxide for each 4 to 12 hydroxyl groups, said reaction taking place in an inert organic solvent which forms an azeotropic mixture with any water present in said reaction, removing a portion of said azeotropic mixture and then adding to the reaction from about 1 to 3 mols, per hydroxyl group contained therein, of an alkylene oxide having from 2 to 4 carbon atoms in the molecule until a homogeneous liquid medium is obtained to which further measured amounts of alkylene oxide is added. The solvent used in this method is supplied to the reaction in a quantity of from about 5 to about 30% of the total reaction medium.

According to the present process, these starting media are used at the same time as carriers for hydroxyl groups and for catalysts. These media may be obtained as undecomposed and surprisingly uniform and stable products from alcohols, phenols and amine alcohols which may contain up to 5 hydroxyl groups and therefore selectively predetermine the structure of the resulting polyethers, and from alkalis such as caustic alkalis and definite quantities of a carrier by reaction with a few mols of alkylene oxide by circulation distillation of the carrier and of the alkylene oxide. They are highly concentrated as regards their alkali content and their content in hydroxyl groups that are capable of addition and are therefore suitable for further alkylene oxide additions over a wide range.

Organic compounds having several hydroxyl groups may be used as starting materials such as, for example, ethylene glycol, 1,2-propylene glycol, 1,3-propylene glycol, diethanolamine, the various butylene glycols, trimethylol propane, 1,5-pentanediol, 1,4-pentanediol, 1,3-hexanediol, 1,7-heptanediol, 1,3,6-hexanetriol, sorbitol, methyl glucoside, glycerol, triethanolamine, pentaerythritol, diethylene glycol, resorcinol, N-di-(hydroxyethoxy)-aniline, 1,4-hydroquinone-dihydroxyethylether and the 4,4'-dihydroxyethyl ether of diphenylmethane.

Alkylene oxides with 2 to 4 carbon atoms to the molecule include ethylene oxide, 1,2-propylene oxide, 1,3-propylene oxide, butylene oxide, butadiene monoxide. Mixtures of alkylene oxides may also be employed. For example, if a mixture of ethylene oxide and 1,2-propylene oxide is used, a polyoxyalkylene compound is formed in which the ethylene oxide and propylene oxide is present in accordance with the proportion used in the mixture.

Any organic liquid which forms an azeotropic boiling mixture with water under the reaction conditions and which is inert to the reactants may be used as solvent and carrier. Examples are aromatic compounds such as benzene, toluene, xylene, ethylbenzene, chlorinated hydrocarbons such as chlorobenzene and the like; oxygenated organic compounds such as anisole, the dimethyl and diethyl ethers of ethylene glycol, of diethylene glycol and the like; normally-liquid saturated hydrocarbons including the open chain, cyclic and alkyl-substituted cyclic saturated hydrocarbons such as pentane, hexane, heptane, various normally-liquid petroleum hydrocarbon fractions, cyclohexane and alkylcyclohexanes, dihydronaphthalene and the like.

The catalyst used is preferably an alkali metal hydroxide, for example, sodium hydroxide, lithium hydroxide, potassium hydroxide and the like. The alkali metal itself, for example, sodium or potassium may be used. Other alkaline materials which may be used as catalyst include trimethyl hydroxyethyl ammonium hydroxide.

The components for the starting medium are introduced into a reaction vessel in the given quantities. The alkali metal hydroxides such as potassium and sodium hydroxide may be used as such or in the form of concentrated aqueous solutions. It is advantageous although not necessary to work under a small pressure in an inert atmosphere. The mixture is heated and the solvent or carrier thereby distills off and any water present and any water formed by the formation of alcoholate is removed azeotropically. The solvent or carrier is circulated back into the reaction mixture, the quantity supplied being such that the subsequent completed starting medium contains about 5 to about 30% of solvent or carrier. It is not necessary to remove the water completely. Depending on the particular polyether to be produced, it may be advisable to leave a residue of water in the starting medium. When the required quantity of water has been removed, the alkylene oxide is slowly added, a constant excess being maintained, so that a part of the alkylene oxide reacts with the alcoholate and the excess of ethylene oxide distills off during the reaction due to the elevated temperature, so that excess alkylene oxide is kept in circulation. Further, alkylene oxide is constantly supplied to the system until a homogeneously liquid starting medium results.

The temperatures in the preparation of the starting medium must be adjusted to the sensitivity of the components, in particular of the catalyst. It must also be adjusted, however, to the reactivity of the alkylene oxide. Temperatures between about 70° C. and 150° C. may generally be employed.

The starting medium prepared serves as the starting material for polymerization to which an alkylene oxide, e.g. any of these described herein, may be added in a discontinuous or continuous process. Mixtures of alkylene oxides may also be used; it being possible to add on different alkylene oxides successively by bulk polymerization. The desired molecular weight range and the desired degree of branching may be controlled very satisfactorily particularly in a continuous process using the homogeneously liquid starting medium, for example, by introducing further measured quantities of starting medium into the continuous polymerization cycle at the desired point and in the desired quantities. Even when the polymerization is carried out in a closed vessel under pressure, it is possible to introduce more starting medium into the vessel in the course of polymerization if desired.

The starting media obtained in accordance with the invention and used for polymerization makes it possible to use as starting components, compounds with several hydroxyl groups which have heretofore been unsuitable owing to their instability, their tendency to discolor as alcoholates, their viscosity and their slowness in reaction. The described starting media themselves are almost colorless, storable and chemically exactly defined, which makes it easier to obtain dosed quantities or rather makes it possible for the first time to do so.

Owing to the accurate control of the reaction which is possible in the process according to the invention, the polyethers according to the invention are distinguished by great purity, uniform molecular weight if desired, or otherwise by a reproducible molecular weight so that they constitute reliable starting materials for further chemical reactions, e.g. for the isocyanate polyaddition process. The product of the process may also be used as lubricants, emulsifiers or wood preservatives.

The accompanying drawing is a diagrammatic flow sheet illustrating the continuous process of the current invention.

In the drawing the reactants, organic compound containing reactive hydrogen groups, inert solvent and alkali metal catalyst are introduced into vessel 11. The temperature in vessel 11 is raised to about 115° C. and water is distilled off through line 23 into azeotropic separator 12. Any solvent which condenses is returned to vessel 11 through line 24. Alkylene oxide is introduced through a reflux column 14 into the alcoholate mixture which is being formed in vessel 11. Simultaneously, the temperature of the reaction mixture is lowered to about 110° C. The introduced alkylene oxide, most of which has evaporated from the mixture is returned to the reflux column 14 through automatic orifice meter 15 and condensed in cooler 16 mounted on the reflux column 14 in countercurrent flow to any fresh alkylene oxide being introduced through line 25. The liquid mixture which collects at the bottom 17 of the reflux column 14 is returned to the reaction mixture through cooled tubes 18. A circulation of alkylene oxide is thus obtained which can be controlled at the reaction temperature of about 105 to about 112° C. The amount of epoxide which reacts is replaced by the addition of more alkylene oxide into reflux column 14. This addition of fresh alkylene oxide is controlled by means of a differential pressure gauge 19 situated on automatic orifice meter 15, the pressure at the column end being set at about 100 to about 150 mm. Hg excess pressure by means of degasifying vessel 20. The whole process is safeguarded by an automatically operating nitrogen supply (not shown) which flows through line 21 and maintains a minimum pressure of about 50 mm. Hg excess pressure in the reaction vessel. The nitrogen introduced in excess and the inert gases introduced with the alkylene oxide are removed over the top of column 14 and the cold trap 22 and degasifying vessel 20.

Temperature control gauge 26 automatically adjusts the temperature of vessel 11 in accordance with the desired amount of solvent and alkylene oxide to be taken off and returned to the reaction mixture during the continuous cycle of operation.

In this manner, there is obtained an almost colorless homogeneous reaction mixture which can be used as a starting medium for further polymerization under the same conditions without interruption of the reaction.

The invention is further illustrated by the following examples in which parts are by weight unless otherwise specified.

EXAMPLE 1

About 215 parts of trimethylol propane, about 37 parts of glycerol, about 100 parts of toluene, and about 112 parts of about 50% aqueous potassium hydroxide are introduced into a vessel which has a capacity of about 10,000 liters. By automatically regulating rise of temperature to about 115° C., about 75 liters of water are distilled from the reaction mixture through the azeotropic separator 12. The toluene which condenses is returned to the apparatus.

Propylene oxide is introduced through reflux column 14 into the alcoholate mixture which is being formed, without interrupting the distillation. At the same time, the temperature of the reaction mixture is lowered to about 110° C.

The propylene oxide, most of which evaporates from the reaction mixture is returned to the reflux column 14 through an automatic orifice meter 15 and condensed in a cooler 16 mounted on the reflux column, in countercurrent to the fresh propylene oxide introduced. The liquid mixture which collects at the bottom 17 of the reflux column is returned to the reaction mixture through cooled tubes 18. A circulation of propylene oxide is thus obtained which can easily be controlled at the reaction temperature of about 105° C. to about 112° C. by heating. The amount of epoxide which reacts is replaced by the addition of more propylene oxide into the reflux column 14. This addition of fresh propylene oxide is controlled by means of a differential pressure gauge 19 situated on the orifice meter between the reaction vessel and the column, the pressure at the column end being set at about 100 to about 150 mm. Hg excess pressure by means of a degasifying vessel 20. The whole process is safeguarded by an automatically operating nitrogen supply which maintains a minimum pressure of about 50 mm. Hg excess pressure in the reaction vessel. The nitrogen introduced in excess and the inert gases introduced with the propylene oxide are removed over the top of the column 14 and the cold trap 22 and degasifying vessel 20.

When about 400 parts of propylene oxide has been utilized there is obtained, in a fully automatic manner, an almost colorless homogeneous reaction mixture which can be used as starting medium for further polymerization under the same conditions without interruption of the reaction.

When a total of about 8,000 parts of propylene oxide has been used, a pure branched polyether, the hydroxyl number of which corresponds to the exact calculated percentage both before and after neutralization with sulphuric acid is obtained from the about 253 parts of trimethylol propane or glycerol introduced, without altering the automatic process.

OH number _____ 40
Average molecular weight _____ 4200
Viscosity, cp./25° C. _____ 650

EXAMPLE 2

About 161 parts of trimethylol propone, about 100 parts of toluene and about 68 parts of concentrated potassium hydroxide are introduced into an apparatus of about 10,000 liters capacity, and after distilling off about 45 parts of water, this mixture is reacted first with about 250 parts and then with about 1600 parts of propylene oxide in the manner described in Example 1. About 350 parts of a second starting medium heated to about 70° C. is then introduced at a uniform rate in the course of about 8 hours into the polymerization which proceeds under the same conditions. This second starting medium was prepared under the conditions described in Example 1 from about 107 parts of trimethylol propane, and about 45 parts of concentrated potassium hydroxide, and about 50 parts of toluene from which about 30 parts of water were distilled off and about 100 parts propylene oxide were then added. About 2500 parts of propylene oxide are used up during the continuous polymerization.

When all the second starting medium has been added, a further about 2000 parts of propylene oxide are incorporated by polymerization into the total reaction mixture. An almost colorless polymer is obtained which, when worked up under neutral conditions, yields a polyether which can be used in the field of polyurethane foam plastics and which has a specific, reproducible molecular weight distribution.

OH number _____ 50
Viscosity, cp./25° _____ 550

EXAMPLE 3

About 357 parts of hexanetriol, about 150 parts of toluene and about 150 parts of concentrated potassium hydroxide introduced into an apparatus of about 10,000 liters capacity are reacted with about 600 parts of propylene oxide as indicated in Example 1 after about 99 parts of water have been distilled off. About 5000 parts of a mixture of ethylene oxide and propylene oxide are then reacted during about 14 hours in a nitrogen atmosphere of 2 atmospheres above atmospheric pressure. A copolymer is obtained which can be used for preparing polyurethane resins as a uniformly branched ether of uniform chain length.

OH number, 75.

EXAMPLE 4

About 100 parts of trimethylol propane, about 100 parts of toluene and about 56 parts of concentrated potassium hydroxide are reacted, in an apparatus of about 10,000 liters capacity, in the manner described in Example 1, first with about 180 parts and then with about 1600 parts of propylene oxide after about 37 parts of water have been distilled off.

About 297 parts of a starting medium prepared from about 49 parts of trimethylol propane, about 51 parts of propylene glycol, about 36 parts of toluene and about 34 parts of potassium hydroxide to which about 150 parts of propylene oxide are added after about 23 parts of water have been distilled off are added to the continuous polymerization.

After a total of about 7000 parts of propylene oxide have been reacted, as in Example 2, the resulting colorless polymer is treated with about 300 parts of ethylene oxide in a nitrogen atmosphere of about 2 atmospheres above atmospheric pressure. A chemically pure, colorless polyether is obtained which, after neutralization can be used with particular effect for foam plastics.

OH number (about) _____ 40
Viscosity, cp./25° C. _____ 600

EXAMPLE 5

About 624 parts of the reaction product of about 128 parts of ethylene diamine and about 496 parts propylene oxide, about 600 parts of toluene and about 120 parts of about 50% potassium hydroxide are reacted with about 496 parts of propylene oxide in an apparatus of about 12,000 liters capacity after about 79 parts of water have been distilled off as indicated in Example 1.

About 8500 parts of propylene oxide are then incorporated into the resulting starting medium with continuous distillation of epoxide. A colorless polymer is obtained which can be worked up into an equally colorless, ash-free polyether after suitable neutralization of the caustic alkali.

OH number, 50.

Although the invention has been described in considerable detail for the purpose of illustration, it is to be understood that variations may be made therein by those skilled in the art without departing from the spirit and scope of the invention except as set forth in the claims.

What is claimed is:

1. A process for the production of polyethers having a reproducible molecular weight from alkylene oxide which comprises preparing a homogeneous liquid and uniformly reactive starting medium by reacting at a temperature of from about 70° to about 150° C. about 1 mol of a member selected from the group consisting of an alkli metal hydroxide, an alkali metal, and trimethylhydroxyethyl ammonium hydroxide for each 4 to 12 hydroxyl groups of an organic compound selected from the group consisting of ethylene glycol, 1,2-propylene glycol, 1,3-propylene glycol diethanol amine, butylene glycols, trimethylol propane 1,5-pentanediol, 1,4-pentanediol 1,3-hexanediol, 1,7-heptanediol, 1,3,6-hexane triol, sorbitol, methylglucoside, glycerol, triethanol amine, pentaerythritol, diethylene glycol, resorcinol, N-di-(hydroxy ethoxy)-aniline, 1,4 hydroquinone dihydroxy ethyl ether and 4,4' dihydroxy ethyl ether of diphenyl methane in an inert organic liquid solvent capable of forming an azeotropic mixture with water selected from the group consisting of liquid saturated hydrocarbons, benzene, toluene, xylene, ethyl benzene, chlorinated hydrocarbonse, anisole and dimethyl and diethyl ethers of ethylene glycol and diethylene glycol, removing a portion of the azeotropic mixture which forms during the reaction, introducing sufficinet solvent to the reaction mixture to yield a final concentration of from about 5 to about 30% of the solvent in the starting medium and then adding from about 1 to about 3 mols of an alkylene oxide having 2 to 4 carbon atoms to the reaction mixture per hydroxyl group contained therein until a liquid homogeneous and uniformly reactive starting medium is obtained and thereafter polymerizing an alkylene oxide with the starting medium to form a polyether.

2. The process of claim 1 wherein the hydroxyl containing compound is trimethylol propane; the alkali metal hydroxide is potassium hydroxide; the inert solvent is toluene and the alkylene oxide is propylene oxide.

3. The process of claim 1 wherein the reaction temperature is from about 100° C. to about 120° C.

4. The process of claim 1 wherein the inert liquid solvent is selected from the group consisting of benzene, toluene, xylene, ethylbenzene, chlorobenzene, anisole, dimethyl ether of ethylene glycol, diethyl ether of ethylene glycol, dimethyl ether of diethylene glycol, diethyl ether of diethylene glycol, pentane, hexane, heptane, liquid petroleum hydrocarbon fractions, cyclohexane and dihydronaphthalene.

5. The process of claim 1 wherein the polyether prepared is a polyoxypropylene glycol having a hydroxyl number of from about 40 to about 75.

6. A process for forming a homogeneous liquid and uniformly reactive starting mixture capable of controlling the polymerization of an alkylene oxide which comprises reacting at a temperature of from about 70° to about 150° C. about 1 mol of a member selected from the group consisting of an alkali metal hydroxide, an alkali metal, and trimethylhydroxyethyl ammonium hydroxide for each 4 to 12 hydroxyl groups of an organic compound selected from the group consisting of ethylene glycol, 1,2-propylene glycol, 1,3-propylene glycol, diethanol amine, butylene glycols, trimethylol propane, 1,5-pentanediol, 1,4-pentanediol, 1,3-hexane diol, 1,7-heptanediol, 1,3,6-hexane triol, sorbitol, methylglucoside, glycerol, triethanol amine, pentaerythritol, diethylene glycol, resorcinol N-di-(hydroxy ethoxy)-aniline, 1,4 hydroquinone dihydroxy ethyl ether and 4,4' dihydroxy ethyl ether of diphenyl methane containing at least two hydroxyl groups in an inert organic liquid solvent capable of forming an azeotropic mixture with water selected from the group consisting of liquid saturated hydrocarbons, benzene, toluene, xylene, ethyl benzene, chlorinated hydrocarbons, anisole and dimethyl and diethyl ethers of ethylene glycol and diethylene glycol, removing a portion of the azeotropic mixture which forms during the reaction, introducting sufficient solvent to the reaction mixture to yield a final concentration of from about 5 to about 30% of solvent in the starting mixture and adding from about 1 to about 3 mols of an alkylene oxide having from 2 to 4 carbon atoms to the reaction mixture per hydroxyl group contained therein until the liquid homogeneous and uniformly reactive starting medium is obtained.

7. The product produced by the process of claim 6.

References Cited

UNITED STATES PATENTS

| | | |
|---|---|---|
| 1,910,331 | 5/1933 | Halbig. |
| 2,233,381 | 2/1941 | De Groote et al. |
| 2,271,873 | 2/1942 | Perkins et al. |
| 2,499,367 | 3/1950 | De Groote et al. |
| 2,782,240 | 2/1957 | Hefner et al. _____ 260—613 |
| 2,870,220 | 1/1959 | Carter. |
| 3,048,548 | 8/1962 | Martin et al. |
| 3,075,928 | 1/1963 | Lanham. |
| 3,190,927 | 6/1965 | Patton et al. |
| 3,291,845 | 12/1966 | Longley et al. |

OTHER REFERENCES

Gaylord, Polyethers, Interscience Publishing Co., New York, 1963, pp. 321–322.

Wyandotte, Technical Data Sheet, "Pluracol TP Triols", 1962.

Wyandotte, Technical Data Sheet, "Pluracol TP 340 Triol", 1960.

LEON ZITVER, *Primary Examiner.*

HOWARD T. MARS, *Assistant Examiner.*

U.S. Cl. X.R.

252—182; 260—210, 573, 584, 613